United States Patent
Arnold

[15] 3,664,077
[45] May 23, 1972

[54] CONNECTION JOINT FOR STRUCTURAL MEMBERS

[72] Inventor: Thomas N. Arnold, Sutter Hotel, 191 Sutter St., San Francisco, Calif. 94104

[22] Filed: June 29, 1970

[21] Appl. No.: 50,401

[52] U.S. Cl. .................................. 52/283, 52/586, 52/665
[51] Int. Cl. ............................................. E04b 1/48, E04c 3/04
[58] Field of Search .................. 52/586, 585, 584, 283, 641, 52/665; 287/20.92 G, 20.92 K

[56] References Cited

UNITED STATES PATENTS

| | | | |
|---|---|---|---|
| 273,967 | 3/1883 | Coutant | 287/20.92 K X |
| 1,617,527 | 2/1927 | Knight | 52/586 |
| 1,743,492 | 1/1930 | Sipe | 52/586 |
| 3,166,873 | 1/1965 | Rosenfeld | 52/585 |
| 3,479,782 | 11/1969 | Muse | 52/585 |
| 1,474,148 | 11/1923 | Hopkins | 52/586 |
| 1,571,093 | 1/1926 | Lally | 52/283 |
| 2,692,034 | 10/1954 | Tidwell | 52/632 |
| 3,336,709 | 8/1967 | Berney | 52/586 |

FOREIGN PATENTS OR APPLICATIONS

| | | | |
|---|---|---|---|
| 1,015,526 | 1952 | France | 52/586 |
| 25,475 | 1899 | Great Britain | 287/20.92 K |
| 274,425 | 1914 | Germany | 287/20.92 K |

Primary Examiner—Henry C. Sutherland
Attorney—Owen, Wickersham & Erickson

[57] ABSTRACT

A connection joint for structural frame members capable of withstanding forces of tension, compression, shearing and bearing utilizes transverse slots on portions of the members to be connected which are brought into register so that key members can be installed in the slots. The key members are in groups of basically two types, those which accommodate bearing and shearing and those which accommodate tension or compression forces that are transverse to the applied shearing forces. The connection is shown in different embodiments such as beam or girder connections with a column or end to end connections of beams, rod or cables.

12 Claims, 12 Drawing Figures

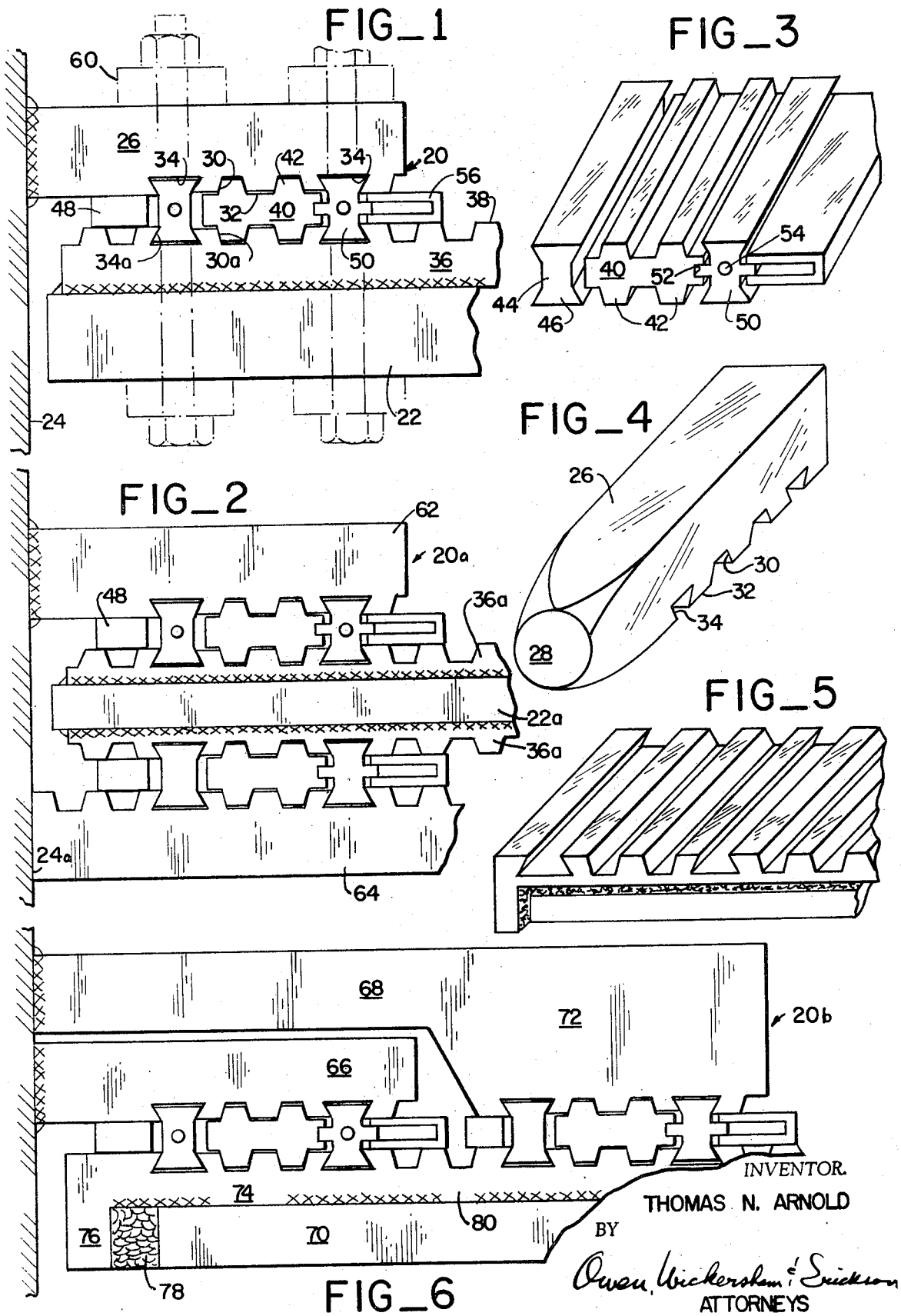

Patented May 23, 1972
3,664,077
3 Sheets-Sheet 2
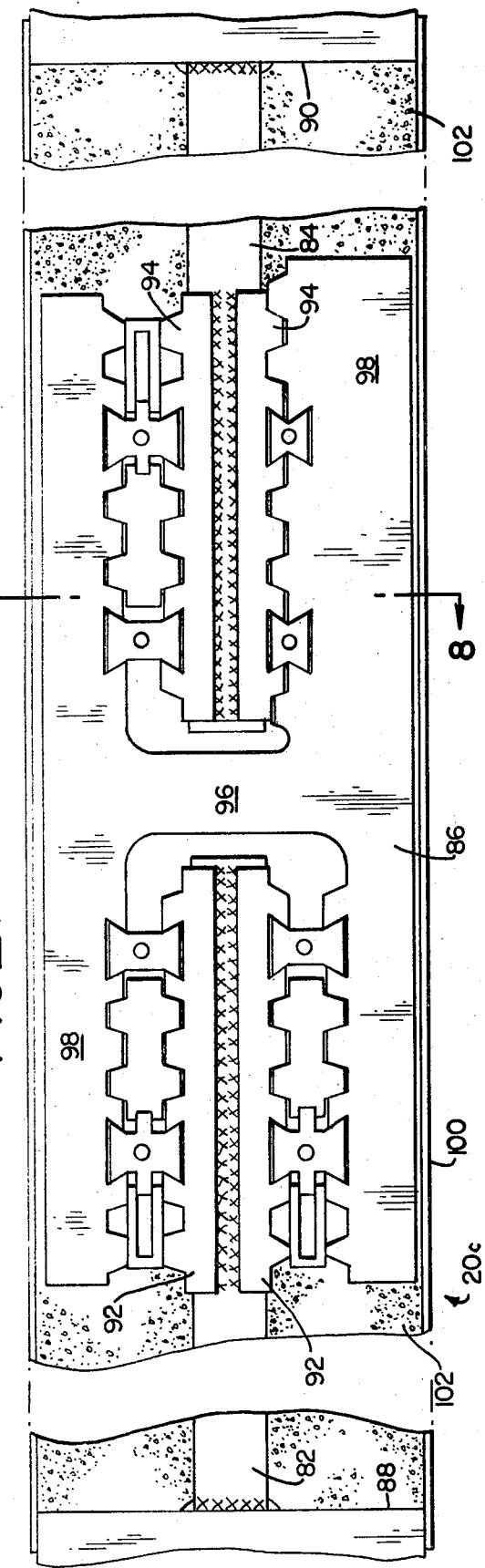
FIG_7
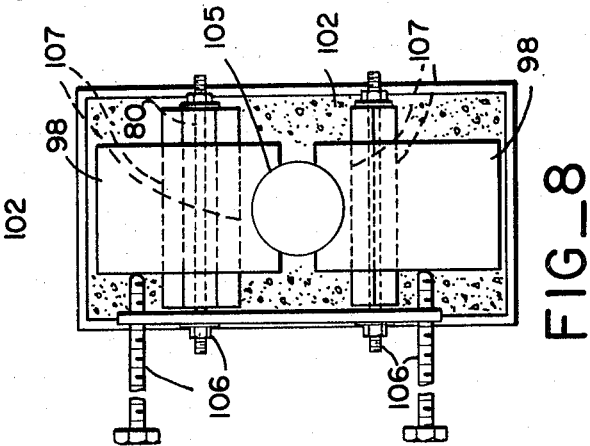
FIG_8
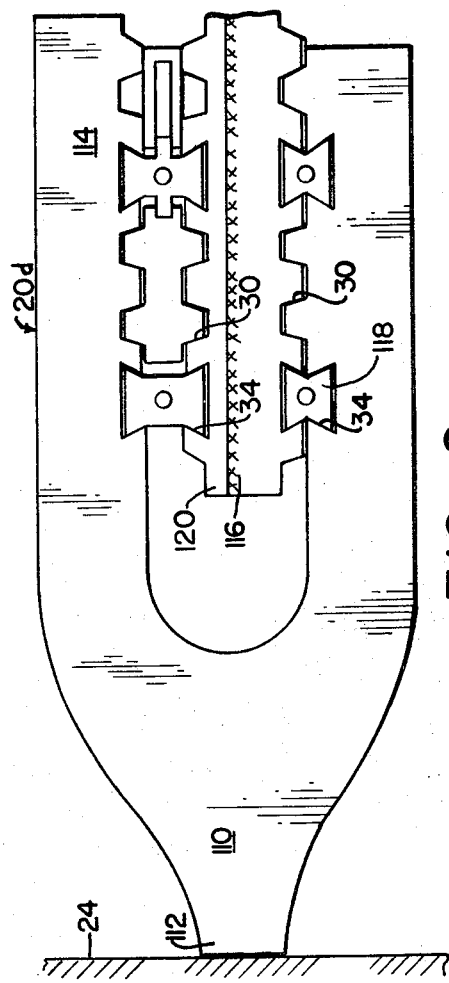
FIG_9
INVENTOR.
THOMAS N. ARNOLD
BY
Owen, Wickersham & Erickson
ATTORNEYS Patented May 23, 1972 3,664,077
3 Sheets-Sheet 3
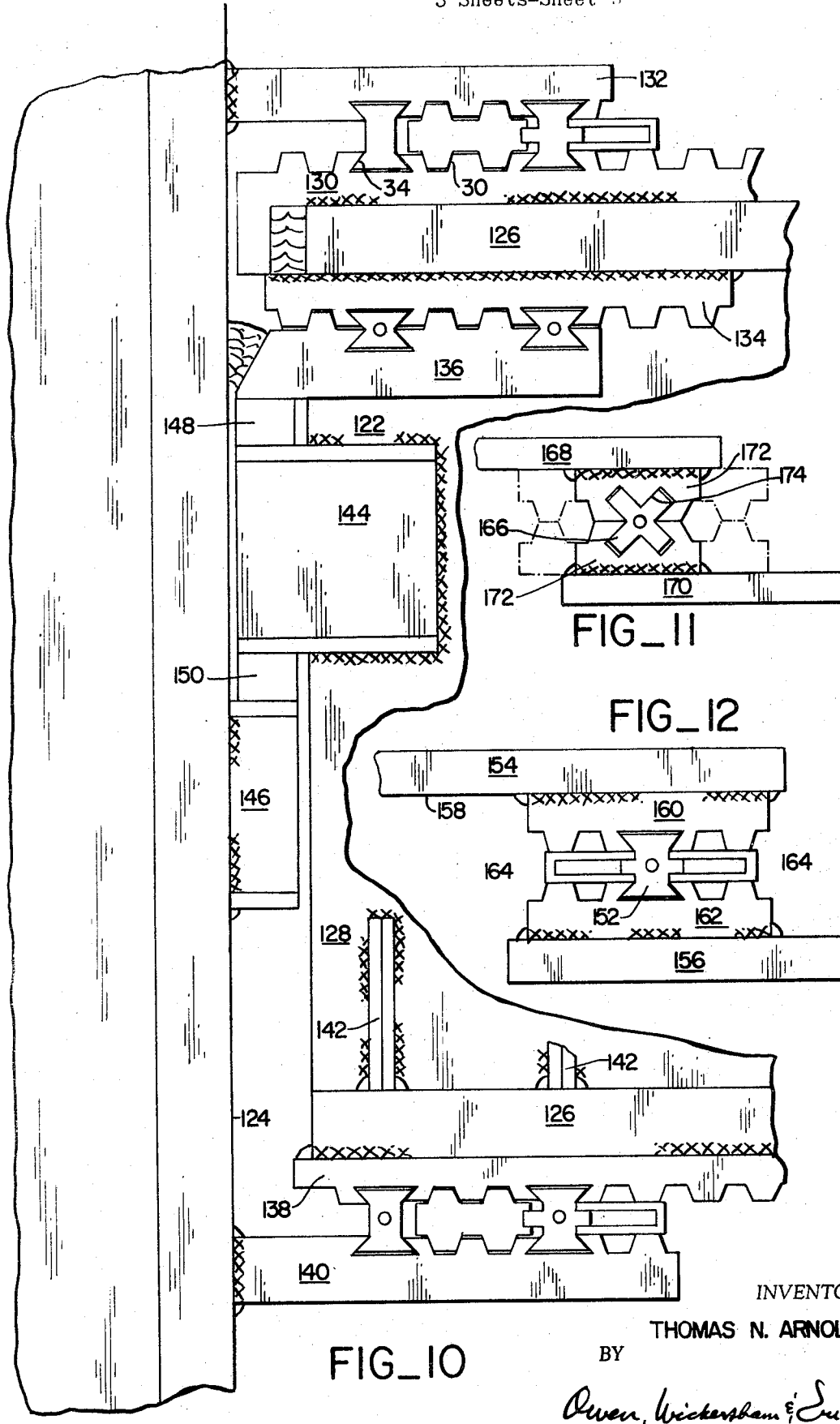
FIG_10  FIG_11  FIG_12
INVENTOR.
THOMAS N. ARNOLD
BY
Owen, Wickersham & Erickson
ATTORNEYS 3,664,077

CONNECTION JOINT FOR STRUCTURAL MEMBERS

This invention relates to connectors for making joints of structural frame members in buildings, bridges and the like capable of withstanding the various joint forces of tension, compression, shearing and bearing.

Conventional structural joints using rivets, bolts and weldments have long been used in a variety of forms in the erection of large frame structures such as buildings. However, the disadvantages of such connectors are well known. For the most part, they are expensive and time consuming to install because they usually require considerable labor in the shop and on the job site. For example, conventional girder to column connections for large buildings heretofore required either the installation of large weldments with inherently low welding efficiency factors or rivets or high tensile bolts (plus the installation of other large weldments) to provide a joint strong enough to resist all of the loads.

It is therefore a general object of the present invention to provide an improved connection for joining structural members with the usual flat or sloping faces or with circular or spherical faces or with complex shaped three dimensional faces.

Another object of the present invention is to provide a connection for structural members that can be largely machine welded and prefabricated to a major extent in the shop so that a relatively small amount of welding and no riveting or bolting may be required during installation on the job site. Maximum welding efficiency factors can thus be attained.

Another object of the present invention is to provide a connection for structural members that will facilitate the assembly of structural connecting joints rapidly with a relatively small amount of time and labor and is comprised of components that can be manufactured with precision in large quantities and at low cost.

Another object of the present invention is to provide a connection for structural members which can be converted on site from a tensile connection to a compression connection of similar load capacity.

Another object of the present invention is to provide a means whereby structural sections can be utilized rough sawn from the mill without the necessity of cutting to precise length at the shop or site or further working such as precise milling, clipping, gouging, grinding or drilling other than to remove edge burring caused by the rough mill cutting.

Another object of the present invention is to provide an effective connection for structural members being erected with an umbrella plate system at the beam connections to structural columns.

Another object of the present invention is to provide a rapid means of connection between simple ties or struts.

Another object of the present invention is to provide an effective means of making connections between members of three dimensional space frames.

Another object of the present invention is to provide an effective means of making a two or three dimensional structural connection such as the edge of a circular plate or sphere.

Another object of the present invention is to provide an effective means of joining a flexible member such as a metal cable to a solid structural member.

Another object of the present invention is to provide a means whereby the moment of inertia of I-beams, channels or the like can be increased if or where required by the addition of short or fully continuous plates, containing connection means for attaching to structural faces at opposite ends of the main members, a system which allows full utilization of machine welding techniques in making the longitudinal connection to the flanges of the said main members.

The aforesaid and other objects are accomplished in the present invention by the use of overlapping members that are interconnected by key elements of two general types that are used in combination to resist shear stresses in the direction of applied loads and compression and tension stresses at right angles to the applied loads. The key members also help to position and align structural members, thereby making it easier for the final connection to be made. In a typical connection, a structural column or beam is provided with a fixed member extending therefrom having a series of transverse slots. A structural member to be connected is also provided at the shop with an attached member having a series of slots. On the job site during the erection procedure a key member is placed in some of the transverse slots of the second member and the two structural members are brought into juxtaposition so that the key member also fits into the transverse slots of the other structural member. At this point, locking key members are driven into other slots of the two structural members that form common openings. This draws the two members together to form an interconnection which has strength to resist shearing, bearing and tension or compression forces. As will be seen from the following detailed description various of my keylock connector devices may be utilized to solve different connecting problems.

Other objects, advantages and features of my invention will become apparent from the following detailed description taken with the accompanying drawings, in which:

FIG. 1 is a view in elevation showing an assembled connection joint embodying the principles of the present invention with clamping means for assembling or dismantling the joint, shown in phantom;

FIG. 2 is a view in elevation showing a modified form of my connection joint in which concentric loading is assured in the connection;

FIG. 3 is a view in perspective of one form of a key assembly used in my connection joint;

FIG. 4 is a view in perspective showing a weldable stud which can be used in the connection joint of FIGS. 1, 2, 6 and 9;

FIG. 5 is a view in perspective showing a typical form of key plate according to the present invention with an optional lip feature;

FIG. 6 is a fragmentary view in elevation showing another embodiment of my connection joint in which one connecting plate or stud overlays the other;

FIG. 7 is a fragmentary view in elevation and in section showing a connection joint for joining the ends of two aligned members;

FIG. 8 is a view in section taken along the line 8—8 of FIG. 7 to indicate method of connection between members of round section such as flexible steel cables or steel rods with one means for removing keys from a joint, shown in phantom;

FIG. 9 is a view in elevation showing another form of my connection joint utilizing a bifurcated stud member;

FIG. 10 is a view in elevation and in section showing a girder connection to a column with connector joints according to my invention;

FIG. 11 is a view in elevation showing another embodiment of my connector joint using a single key member; and FIG. 12 is another embodiment of my connector joint using a modified key member.

Referring to the drawing, FIG. 1 shows a connector or joint 20 embodying the principles of the present invention, which can be applied to connect various types of structural members in buildings, bridges, ships and other structures. In this joint, a horizontally oriented member or beam flange 22 is connected to a vertical member of column 24. In any structure such a connection would be subject to the usual shearing, bearing and tension or compression stresses in varying degrees and the joint must have sufficient strength to withstand them all. As shown, the joint comprises a relatively short member 26 that can be welded to the column 24 in a convenient manner. In this case, the member 26 has a stud-like configuration so that it can be quickly and efficiently welded to the column by a stud welding apparatus of the type that are commercially available. As shown in FIG. 4, such a stud member 26 may taper to a circular cross section on the end 28 to be welded but preferably throughout most of its length it has a square or rectangular cross section. On one side of the stud 26 are a series of transverse grooves or slots. It will be noted that these slots are of essentially different shapes. There are slots 30 having sidewalls that converge inwardly from the bottom face 32 of the stud, and slots 34 whose sidewalls diverge inwardly so as to be undercut. In the stud 26, shown by way of illustrating the invention and in other embodiments yet to be described, only two slots of each type (30 and 34) are provided in each connection. However, as will be apparent this is not meant to be a limiting factor and different numbers of the two general types of slots may be used.

On the upper surface of the horizontally oriented member or beam flange 22 is a key plate 36 which has a surface 38 formed with a series of grooves or slots 30a and 34a that are shaped and dimensioned so as to be identical to the two types of slots 30 and 34, respectively, in the stud. The key plate 36 is fixed to the structural member 22 preferably in the shop and not on the job site by welding or some other suitable means or it can be used as a continuous, structural member itself or fixed continuously for the length of the structural member. In the assembled connection the slots of the stud member are located directly above and matched with those of the key plate on the horizontal member. Seated within these slots are a series of key members of suitable structural material such as metal, plastic, wood or the like, as shown in FIG. 3. The slots 30 and 30a with convergent sidewalls are filled with a first or central key member 40 which is essentially comprised of an elongated bar of uniform thickness having one, two or more pair of ridges, which in the case of multiple ridges are separated by grooves of the same shape on opposite sides of the bar. The ridge portions 42 of the first key fit within the slots of both the stud member and the key plate. A second key member 44 is spaced to the side of the first or central key member 40 and has a central bar portion equal in thickness to the horizontal bar of the first key members and ridge portions 46 on opposite sides having sidewalls that diverge at the same angle as the slots 34 and 34a. Along the outer side of the central portion of the first key member is a shim 48 which fits tightly between the faces 32 and 38 of the stud member 26 and the horizontal member 36. This serves to increase the rotational stiffness of the connection when inserted after a suitable clamp device has been removed from the line of the slots for the third key member as will be described later.

On the other side of the first key member 40 is a third key member 50 that is similar to the second key member except that its central portion has a smaller thickness and thus fits within a groove 52 along one side of the first key member 40. The second and third key members may be provided with a hole 54 preferably located centrally on the key members running longitudinally the whole length of the key members to facilitate their removal, when necessary. Along the other side of the central portion of the third key member 50 are retaining shims or a clip 56 with ends that fit between the central portion of the third key member and the grooved surfaces 32 and 38 of the stud member and the key plate.

To assemble the connection joint 20, the stud 26 is preferably welded in place on the column 24 and the key plate 36 is welded to the horizontal member 22. Both of operations can be performed in the shop rather than on the job site. Now, a first key member 40 is placed within the slots of the key plate and the horizontal member 22 is brought into alignment with the stud member so that the upper ridges 42 of the key member fit within the slots 30 of the stud member. A suitable clamping means which is shown in phantom in FIG. 1 and designated by the numeral 60 may be applied to exert pressure between the stud member and the horizontal member. This clamping means is preferably aligned initially with the slots for the second key member 46 which is now inserted to hold the stud member and key plate together. With the second key member in place the clamping means 60 can be moved to apply pressure in line with the slots for the third key member 50 and this key member can now be inserted by driving it into place as shown in FIG. 1. Following insertion of the third key member, the retaining shims or clip 56 is also driven in place.

The purpose of the shims or a clip is to provide means of ensuring a tight fit between the faces of the stud member and the horizontal member and the bearing faces of the third key member against those of the stud member and the horizontal member, thereby increasing the capacity of the key to resist shearing forces.

When in place, the connection 20, as shown in FIG. 1, provides strength to resist all of the stresses that normally occur at construction joints. All of the ridge members provide strength to resist shear forces that extend horizontally between the connected members. In addition, the locking second and third key members 46 and 50 oppose the forces induced by any eccentricity between the forces in the main members which may cause a moment tending to rotate and pull apart the connected members along lines at right angles to the direction of the applied loads in the members by spacing the second and third key members on the outer extremities of the key assembly the moment arm leverage is increased with a resulting proportional decrease of forces to be resisted by the second and third key members in the direction at right angles to the direction of the applied loads in the structural members.

In FIG. 2 a modified connection 20a is shown wherein the horizontal member 22a has key plates 36a on both its upper and low surfaces. The column member 24a is provided with an upper projecting member 62 and a lower projecting member 64, both of which can be welded stud members like the stud 26 or plates attached by conventional butt welding. Both of these members are provided with transverse slots of the two types described with reference to FIG. 1 and two sets of key members are installed, as previously described.

The embodiment of FIG. 6 illustrates another connection joint 20b according to my invention wherein two projecting members 66 and 68 are attached to a column 24 but both project outwardly above the horizontal member 70 being connected. The first projecting member may be a stud-like member similar to the stud 26, as previously described, but the second projecting member 68 is located above the first member and has an enlarged outer end portion 72 with slots for key members. A key plate 74 attached to the horizontal member has slots of the two forms previously described that are adequate in number, size and spacing to align with similar slots in both projecting members. Thus, two sets of key members are required for this connection. This key plate, as shown, has a bent over front lip portion 76 that is secured by a weldment 78 to the horizontal member 70, in addition to the usual horizontal weldments 80.

In FIGS. 7 and 8 a connection joint 20c is shown for joining together two horizontal members 82 and 84 by means of an I-shaped connector 86.

The two horizontal members may be welded to two spaced apart faces of columns 88 and 90 as shown or they may be any two aligned members of a fabricated frame structure that require a structural connection. Fixed to the opposite sides of these two aligned members which, in the example shown, are cylindrical in shape, are pairs of key plate members 92 and 94 having slots or grooves that are shaped and spaced in the same manner as those shown in the key plates of the previous embodiments. The I-shaped connector 86 has a central web portion 96 with leg portions 98 extending at right angles therefrom, each of the leg portions having an inner surface with slots shaped and spaced in the same manner as the key plates. To convert the joint 20c and joined members 82 and 84 from a structural component capable of resisting tensile forces to a structural component capable of resisting compressive forces of similar magnitude, the I-shaped connector 86 may be enclosed in a metal sleeve 100 and the interspace between the I-shaped connector and the sleeve filled with any cementitious or solidifying compound 102 capable of assuming a rigid form and imparting lateral support and stiffness to the joint and the joined members.

In FIG. 8 an embodiment of the present invention is shown wherein the key plates 98 having transverse slots 107 of the two types described previously with reference to FIGS. 1 and 2 are formed on the faces opposite to the to the transverse slots in the shape of the arc of a circle 105 so that the key plates can fit snugly thereby facilitating easy attachment to the outer circumference or perimeter of structural members of curved or multifaceted cross section such as round, hexagonal, or octagonal shaped metal rods and tubes or round flexible metal cable. The means shown 106 wherein second and third locking key members can be removed is applicable to FIGS. 1, 2, 6, 7, 9, 10, 11 and 12.

FIG. 9 shows still another connection joint 20d of the present invention wherein a stud member 110 is shaped like a tuning form with one end 112 fixed to a column 24 and spaced apart portions 114 between which the member 116 to be connected extends. On the inner surface of the spaced apart portions of this bifurcated stud member are transverse slots 30 and 34 having the same shape and spacing as the slots on previously described embodiments. To illustrate another variation of my joint connection, the member 116 being connected is itself slotted on one side and is adapted to bear directly against the inner surface of one of the stud or plate portions. In this instance, tranverse ridge portions on the horizontal member 116 and the lower leg 114 of the stud 110 mesh together in similarly shaped grooves in the adjacent member and thus only locking type key members 118 need be inserted to hold these two members together. On the other side of the horizontal member, a key plate 120 is attached having transverse grooves or slots 30 and 34 which are spaced from the similarly shaped slots in the other portion of the stud member. On this side, a series of key members 40, 46 and 50 such as used in the connection of FIG. 1 are inserted to complete the joint, thereby providing the additional strength required to resist the forces in the members.

In FIG. 10, I have shown a typical installation of a girder 122 joined to a column 124 as in a rigid bending moment frame structure and using the connection joints according to my invention. The girder may be of the standard "I" beam type having upper and lower flanges 126 and a connecting web section 128. As shown, the upper girder flange is provided with a key plate 130 having transverse slots 30 and 34 of the two types previously described with reference to FIGS. 1 and 2. The top of the upper girder flange is connected to a stud or plate member 132 on the column by a series of key members in the manner shown in FIG. 1. The underside of the upper girder flange is also provided with a key plate 134 having transverse slots of the two types previously described. These teeth form ridge portions which mesh in slots 30 between similar ridge portions in another projecting member 136 welded to the column. The lower key plate and latter projecting member also have slots 34 with diverging side walls which receive key members of the locking type such as 118. On the lower flange of the girder, a key plate 138 is provided on its under surface having slots of the two types previously described. These slots are aligned with another projecting member 140 such as a welded stud having transverse slots so that the key plate and the stud may be connected by a series of key members of the type previously described. No connecting members are utilized on the top of the lower flange portion of the girder in this embodiment although it may be desirable to install vertical stiffeners 142 between the flange 126 and the web 128 of the girder as by welding to resist eccentric moments at this point. To supply shear strength between the girder and the column, a channel section 144 may be welded to the girder web which extends beyond its end edge. This latter channel is positioned so that it is supported on a similar channel 146 fixed to the adjacent surface of the column.

To ensure that shear in either direction up or down is imparted to the column face, tightly fitting shims 148 and 150 are inserted above and below the flanges of the channel section 144 which is welded to the girder web.

In FIG. 11 I have shown another joint connection according to the present invention utilizing a single key member 152 with a similar configuration to that of the third key member shown in FIGS. 1, 2, 3, 6, 7, 9 and 10. The members 154 and 156 to be connected have attached to them on their facing inner surfaces 158, key plates 160 and 162 each with transverse slots of the same general shape and spacing as the slots in the previously described embodiments. This connection contains all the inherent advantages of the key plate assemblies previously described such as capacity to resist shearing and bearing forces in the direction of the applied loads and any induced rotational forces or forces at right angles to the direction of the applied loads which may be caused by the eccentricity between the said applied loads or similar conditions. This form of connection has the advantage described previously whereby the retaining shims or clips 164 similar to the clip 56 are driven into place thereby ensuring the tight fit between the faces of the key plates and between the bearing faces of the single key member. This is essential to prevent joint slackness in this kind of connection.

FIG. 12 shows still another form of connection embodying the principles of my invention utilizing a key member 166 having a cruciform shape in cross section. The members 168 and 170 to be connected have attached to them on their facing inner surfaces a pair of key plates 172 with two transverse slots 174 formed at an angle to the faces of the key plates which provides a half cruciform shape. The remainder of the plate may assume the same general shape and spacing as the slots on previously described embodiments. This form of connection contains most of the inherent advantages of the key plate assemblies previously described such as capacity to resist shearing and bearing forces in the direction of the applied loads and any induced rotational forces or forces of shearing, bearing, tension or compression at right angles to the direction of the applied loads which may be caused by the eccentricity between the said applied loads or similar conditions. This form of connection has the advantage in the relative ease of completing the joint by the insertion of one cruciform shaped key 166 only and is normally utilized where some slackness in the joint is permissible and where loads are of the lower magnitude referred to in the description of FIG. 11. Likewise it can be substituted for the third key member described in FIGS. 1, 2, 3, 6, 7, 9 and 10 wherein the tightening feature utilizing shims or clips previously described is not a criteria of efficiency in respect to an acceptance of the joints described.

As previously mentioned, the general method for assembling any of the connecting joints according to my invention is to first bring the two slotted members into register. The key members 40 of the first type are initially placed in the appropriate slots of one member and as the members are brought together with their slots in register they can be temporarily clamped. Then, the second and third locking key members 46 and 50 and the shims or clip 56 can be driven into place.

To dismantle the connection joint, all retaining shims or clips adjacent to second and third locking keys are first removed to relax the pressure on the bearing forces of the locking keys. These locking keys must not be removed and a means for doing this is shown in phantom in FIG. 8. A threaded rod or similar mandrel like tool 180 can be inserted through the hole 54 provided centrally along the longitudinal axis of the second and third locking key members. A jacking ram is then applied to one end of the said members 180, thereby producing a steady axial force to the ends of locking key members. Sufficient force may be produced to drive the locking key members completely out of the slots on the key plates containing the key members.

If necessary, clamps as shown in phantom in FIG. 1 may be applied to ease the frictional resistance between the faces of the key member being removed and the key plates. The joint can now be released at right angles to the direction of the applied loads and each structural member in most cases may be parted one from the other.

From the foregoing it should be apparent that the present invention provides a connection joint for structural members that eliminates almost entirely the time consuming and expensive job site procedures. With my joints, the major welding and fabrication of members can be accomplished in the shop where precision tooling is available. When the structural members are actually ready to be connected, the procedure is simple and the joints can be accomplished rapidly by relatively unskilled labor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A connection joint for joining together load carrying members of a frame structure comprising:
   projection means adapted to be fixed to one of said members and having a series of spaced apart slots and ridge portions;
   means on the other load carrying member having a similar series of spaced apart slots and ridge portions;
   key means seated in said slots of both of said members, said key means being shaped to resist shear and bearing forces along a direction of the forces applied to said slots and also those induced rotational forces or induced forces at right angles to the applied forces tending to pull apart said load carrying members, said key means including a first key member having spaced apart ridge portions on both sides with converging sidewalls forming tapered slots of substantially the same shape between the ridge portions, a second key member with portions on both sides having divergent sidewalls and a third key member having dovetail portions on both sides with divergent sidewalls and a tongue portion between said dovetail portions adapted to fit in a groove in said first key member.

2. The connection joint as described in claim 1 wherein said key means further includes shim means that fits adjacent to opposite sides of a tongue portion between said load carrying members on one side of said third key member.

3. The connection joint as described in claim 1 wherein said key means further includes a shim member that is inserted on one side of the said second key member between said load carrying members.

4. The connection joint as described in claim 1 wherein said second and third locking key members are each provided with a hole running the full length of their respective longitudinal axis.

5. A connection assembly for joining an I-beam girder having upper and lower flanges connected by a web portion to a column having a vertical face in a building construction comprising:
   upper projection means adapted to be attached to the column face and to extend therefrom at right angles and having spaced apart transverse slots and ridge portions;
   upper key plate means fixed to the upper girder flange also having spaced apart transverse slots and ridge portions similar to those on said projection means;
   upper key means seated in said slots of both said upper projection means and said key plate means for holding them together and resisting tension compression shearing and bearing forces;
   a lower projection means adapted to be attached to the column face and to extend therefrom at right angles near the lower girder flange and having spaced apart transverse slots and ridge portions;
   lower key plate means fixed to said lower girder flange and having transverse slots and ridge portions;
   and lower key means seated in said slots of both said lower key plate and said lower projection means.

6. The connection assembly as described in claim 5 including a first additional shear member fixed to the web of said girder below said upper projection means, and a second additional shear member adapted to be fixed to the column face below said first shear member, and shim means between said additional shear members.

7. The connection assembly as described in claim 5 wherein said upper projection means comprises elongated stud members welded at one end to the column face.

8. The connection assembly as described in claim 5 wherein said upper projection means comprises a pair of parallel members adapted to be attached to the column face above and below the upper girder flange, said upper key plate means includes plate members fixed to the upper and lower surfaces of the upper girder flange, and said upper key means includes separate key members for the two parallel members and key plate members.

9. The connection assembly as described in claim 5 wherein said lower projection means includes a single member adapted to be fixed to the column face and to project therefrom at a right angle under the lower girder flange, and a single low key plate member fixed to the bottom surface of the lower girder flange.

10. The connection assembly as described in claim 5 wherein said key means includes a first key member having spaced apart ridge portions on both sides with converging sidewalls forming tapered slots of substantially the same shape between the ridge portions, and a second key member with portions on both sides having divergent sidewalls.

11. The connection assembly as described in claim 10 wherein said key means further includes a third key member having dovetail portions on both sides with divergent sidewalls and a tongue portion between said dovetail portions adapted to fit in a groove in said first key member.

12. A connection assembly for joining together the ends of two members comprising:
   a pair of key plates fixed to opposite sides of each member to be joined near its end, all of said key plates having a series of transverse slots of predetermined size and shape;
   a connector member having arm portions over-lapping the ends of the members being joined, the inner surfaces of said arms also having transverse slots of a predetermined size and shape and registered for alignment with the slots of said key plate; and key means seated within the registered slots of said key plates and said connector arms, said key means including a first key member having spaced apart ridge portions on both sides with converging sidewalls forming tapered slots of substantially the same shape between the ridge portions, a second key member with portions on both sides having divergent sidewalls and a third key member having dovetail portions on both sides with divergent sidewalls and a tongue portion between said dovetail portions adapted to fit in a groove in said first key member.

* * * * *